(12) United States Patent
Kinney, Jr.

(10) Patent No.: US 7,835,957 B1
(45) Date of Patent: *Nov. 16, 2010

(54) METHOD AND SYSTEM FOR CORRECTING MARKET FAILURES WITH PARTICIPANT ISOLATION IN DUTCH STYLE ONLINE AUCTIONS

(75) Inventor: Sam E. Kinney, Jr., Sewickley, PA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,867

(22) Filed: Jan. 24, 2000

(51) Int. Cl.
*G06Q 40/00* (2006.01)

(52) U.S. Cl. ........................................ 705/35

(58) Field of Classification Search ............. 705/35–37
See application file for complete search history.

(56) References Cited

U.S. PATENT DOCUMENTS

| | | | |
|---|---|---|---|
| 3,581,072 A | 5/1971 | Nymeyer .................... 235/152 | |
| 3,863,060 A | 1/1975 | Rode et al. | |
| 4,597,045 A | 6/1986 | Kiuchi | |
| 4,674,044 A | 6/1987 | Kalmus et al. ............. 364/408 | |
| 4,789,928 A | 12/1988 | Fujisaki ..................... 364/401 | |
| 4,799,156 A | 1/1989 | Shavit et al. | |
| 4,845,625 A | 7/1989 | Stannard .................... 364/407 | |
| 4,881,178 A * | 11/1989 | Holland et al. ............. 706/12 | |
| 4,992,940 A | 2/1991 | Dworkin .................... 364/401 | |
| 5,136,501 A | 8/1992 | Silverman et al. .......... 364/408 | |
| 5,193,056 A | 3/1993 | Boes ......................... 364/408 | |
| 5,243,515 A | 9/1993 | Lee ........................... 364/401 | |
| 5,297,032 A | 3/1994 | Trojan et al. ............... 364/408 |
| 5,375,055 A | 12/1994 | Togher et al. .............. 364/408 |
| 5,394,324 A | 2/1995 | Clearwater ................. 364/402 |
| 5,402,336 A | 3/1995 | Spiegelhoff et al. ........ 364/401 |
| 5,606,602 A | 2/1997 | Johnson et al. ............ 379/115 |
| 5,629,982 A | 5/1997 | Micali |

(Continued)

FOREIGN PATENT DOCUMENTS

CA 2180995 1/1998

(Continued)

OTHER PUBLICATIONS

Malone et al., "The Logic of Electronic Markets", *Harvard Business Review*, No. 893II (May-Jun. 1989).

(Continued)

*Primary Examiner*—Stefanos Karmis
*Assistant Examiner*—Jessica L Lemieux
(74) *Attorney, Agent, or Firm*—Van Pelt, Yi & James LLP

(57) ABSTRACT

A method and system for conducting online auctions in a Dutch format is disclosed. Isolation of bidders in the online Dutch auction is exploited by creating unique views into the Dutch auction. In one embodiment, posted prices are originally defined in the context of the originator of the auction. These posted prices are transformed into the individual contexts of potential bidders prior to display at the bidder computer system. Multiple views into the Dutch auction are thereby supported. In another embodiment, feedback formats are specified for one or more of the potential bidders. The specified feedback formats enable the originator of the auction to control the types of market clearing information that will be withheld from the various potential bidders.

15 Claims, 10 Drawing Sheets

U.S. PATENT DOCUMENTS

| | | | |
|---|---|---|---|
| 5,640,569 A | 6/1997 | Miller et al. | |
| 5,664,115 A | 9/1997 | Fraser | 705/37 |
| 5,684,963 A | 11/1997 | Clement | 395/226 |
| 5,689,652 A | 11/1997 | Lupien et al. | 395/237 |
| 5,715,402 A * | 2/1998 | Popolo | 705/37 |
| 5,727,165 A | 3/1998 | Ordish et al. | 395/237 |
| 5,758,327 A | 5/1998 | Gardner et al. | 705/26 |
| 5,758,328 A | 5/1998 | Giovannoli | 705/26 |
| 5,765,138 A | 6/1998 | Aycock et al. | 705/7 |
| 5,774,873 A | 6/1998 | Berent et al. | 705/26 |
| 5,794,207 A | 8/1998 | Walker et al. | 705/23 |
| 5,794,219 A | 8/1998 | Brown | 705/37 |
| 5,797,127 A | 8/1998 | Walker et al. | 705/5 |
| 5,799,151 A | 8/1998 | Hoffer | 395/200.34 |
| 5,799,285 A | 8/1998 | Klingman | |
| 5,802,502 A | 9/1998 | Gell et al. | 705/37 |
| 5,803,500 A | 9/1998 | Mossberg | |
| 5,809,483 A | 9/1998 | Broka et al. | |
| 5,826,244 A | 10/1998 | Huberman | |
| 5,832,496 A | 11/1998 | Anand | |
| 5,835,896 A | 11/1998 | Fisher et al. | |
| 5,862,223 A | 1/1999 | Walker et al. | |
| 5,890,138 A * | 3/1999 | Godin et al. | 705/26 |
| 5,897,621 A | 4/1999 | Boesch et al. | |
| 5,905,974 A | 5/1999 | Fraser et al. | |
| 5,905,975 A | 5/1999 | Ausubel | |
| 5,915,209 A | 6/1999 | Lawrence | |
| 5,966,699 A | 10/1999 | Zandi | |
| 6,014,627 A | 1/2000 | Togher et al. | |
| 6,016,344 A | 1/2000 | Katz | |
| 6,021,398 A | 2/2000 | Ausubel | |
| 6,023,685 A | 2/2000 | Brett et al. | |
| 6,026,383 A * | 2/2000 | Ausubel | 705/37 |
| 6,044,363 A | 3/2000 | Mori et al. | |
| 6,055,518 A | 4/2000 | Franklin et al. | |
| 6,058,379 A | 5/2000 | Odom et al. | |
| 6,061,663 A | 5/2000 | Bloom et al. | |
| 6,078,906 A | 6/2000 | Huberman | |
| 6,119,229 A | 9/2000 | Martinez et al. | |
| 6,151,589 A | 11/2000 | Aggarwal et al. | |
| 6,161,099 A | 12/2000 | Harrington et al. | |
| 6,178,431 B1 * | 1/2001 | Douglas | 715/512 |
| 6,199,050 B1 | 3/2001 | Alaia et al. | |
| 6,230,146 B1 * | 5/2001 | Alaia et al. | 705/37 |
| 6,243,691 B1 | 6/2001 | Fisher et al. | |
| 6,266,652 B1 | 7/2001 | Godin et al. | |
| 6,415,270 B1 * | 7/2002 | Rackson et al. | 705/37 |
| 6,647,373 B1 * | 11/2003 | Carlton-Foss | 705/37 |
| 6,721,715 B2 * | 4/2004 | Nemzow | 705/26 |
| 7,330,826 B1 * | 2/2008 | Porat et al. | 705/26 |

FOREIGN PATENT DOCUMENTS

| | | |
|---|---|---|
| CA | 2298 481 | 9/1998 |
| EP | 0 399 850 A | 11/1990 |
| WO | WO 92/15174 A1 | 9/1992 |
| WO | 97/37315 | 10/1997 |
| WO | WO 97/37315 A1 | 10/1997 |
| WO | WO 98/34187 A1 | 8/1998 |
| WO | WO 98/38844 | 9/1998 |
| WO | WO 99/63461 A1 | 12/1999 |

OTHER PUBLICATIONS

Freemarkets™ Online, "Bidware Manual" (Jun. 9, 1988).
WebAuction.com, "How to Play" (1998).
Auction Sales, "Live Auctions Online" (Sep. 1998).
Auction Port, "Online Auction Community—New Auctions Since Sep. 2, 1998" (Jul. 1998).
OnSale, "How to Play" (1998).
u-Auction-It™ (1997).
Freemarkets Online™, "Homepage" (1998).
Andrews, "Auctions Catch the Interest of Hobbyists and Big Business", Aug. 24, 1998.
Associated Press, "Auction on Web is Buyer's Market", Apr. 6, 1998.
Steinert-Threlkeld, "New Watchwords: Let Sellers Beware", Jun. 1, 1998.
Woolley, "E-muscle", Mar. 9, 1998.
Associated Press, "FreeMarkets Takes Auction on Internet", Feb. 23, 1998.
Jahnke, "How Bazaar" (Aug. 27, 1998).
Wilder, "What's Your Bid?—FreeMarkets' real-time online bidding technology lets clients drive down costs and improve product value", Nov. 10, 1997, *InformationWeek*.
Jean-Pierre Banatre, et al., "The Design and Building of Enchere, a Distributed Electronic Marketing System" Communications of the ACM, No. 1 (Jan. 29, 1986).
Danny Cohen, "Computerized Commerce" Information Processing 89 (Aug. 28-Sep. 1, 1989).
Anton, J., et al, "Split Awards, Procurement, and Innovation," RAND Journal of Economics, vol. 20, No. 4, Winter 1989, pp. 538-552.
Auction, Procedures, Terms and Conditions, Tab B, retrieved from http://wireless.fcc.gov/auctions/18/releases/220_b.pdf#search= 'AUCTION,%20PROCEDURES,%20TERMS%20AND%20CONDITIONS%20, Dec. 1997, pp. 91-112.
Boston Globe, "Venture Capitalists Fund Two Massachusetts Internet Related Companies," Jan. 14, 1998, 2 pages.
Business Editors and Computer Writers, Moai Technologies: Moai Technologies Introduces New Category of Business-to-Business Auction Software That Enables "Virtual Private Marketplaces," Mar. 16, 1998, 2 pages.
Business Wire, "Broadvision Developing First Interactive Commerce Management System to Support Online Sales & Marketing Process; New Software Category Necessary to Interactive Network Architecture," May 15, 1995, 2 pages.
Business Wire, "FairMarket Launches New Self-Serve Auctions," Jun. 16, 1998, 1 page.
Computer Finance, "Sold!. . . To the Lowest Bidder," vol. 6, No. 2, Jul. 1995, 8 pages.
Electronic Buyers' News, "Online Bidding Software Updated," Issue No. 1072, Aug. 25, 1997, 1 page.
Kikuchi, et al., "Multi-Round Anonymous Auction Protocols," TIEICE: IEICE Transactions on Communications /Electronics/Information and Systems, Proceedings of IEEE Workshop on Dependable and Real-Time E-Commerce Systems (DARE'98), Jun. 1998, 8 pages.
Lee, Ho Geun, "Do electronic marketplaces lower the price of goods?" Communications of the ACM, vol. 41, No. 1, Jan. 1998, 10 pages.
Reck, M., "Types of Electronic Auctions," Hochschule St. Gallen, 1994, pp. 236-243.
Sairamesh, J., et al., "Economic Framework for Pricing and Charging in Digital Libraries," D-Lib Magazine, Feb. 1996, 11 pages.
Simmons, P., et al., "Procurement Auctions with Multiple Sourcing," University of York Discussion Papers in Economics, No. 95/11, 1995, pp. 1-29.
Vigoroso, M., "Buyers prepare for brave new World of E-Commerce," Purchasing, vol. 126, No. 6, Apr. 22, 1999, 5 pages.
Von Det Fehr, et al., "Predatory bidding in Sequential Auctions," Oxford Economic Papers vol. 46, No. 3, Jul. 1994, 9 pages.
Washington Telecom News, "What you need to know to bid in FCC's Narrowband Auction," vol. 2, No. 26, Jun. 27, 1994, 2 pages.
Wrigley, C., "Design Criteria for Electronic Market Servers," Electronic Markets, vol. 7, No. 4, 1997, pp. 12-16.
Wurman, P., et al., "The Michigan Internet AuctionBot: A Configurable Auction Server for Human and Software Agents," Artificial Intelligence Laboratory, University of Michigan, May 13, 1998, 8 pages.
Freemarkets Online, "Online Industrial Market Making, An Overview of Purchasing Executives," Have not been able to locate this prior art as of Mar. 23, 2005.

* cited by examiner

|  | Coordinator | Buyer | Supplier |
|---|---|---|---|
| Initial Contact 102 | Contact buyer | Provide Data |  |
| RFQ 104 | Collect & Administer RFQ Data | Provide RFQ Data |  |
|  | Publish & Administer RFQ |  | Access RFQ |
|  | Manage RFQ Response |  | Respond to RFQ |
| Auction Administration 106 |  | Request Auction |  |
|  | Coordinate & Administer Auction Setup |  |  |
|  | Assist & Administer User Auction Prep |  | Prepare for Auction |
| Conduct Auction 108 | Assist & Administer Auction | Observe | Bid |
| Administer Auction Results 110 | Analyze & Administer Auction Results | View Auction Results | View Auction Results |
| Contract Administration 112 |  | Settlement | Settlement |

Fig. 2

| Lot # | Lot Name | Quantity | Current Price | Countdown |
|---|---|---|---|---|
| 1 | Coal A | 50,000 tons | 92 cents /Million BTU | 0:02 |
| 2 | Coal B | 20,000 tons | Not Open | --- |

Fig. 8A

| Lot # | Lot Name | Quantity | Current Price | Countdown | |
|---|---|---|---|---|---|
| 1 | Coal A | 50,000 tons | $13.79/ton | 0:02 | Accept |
| 2 | Coal B | 20,000 tons | Not Open | ---- | Accept |

Fig. 8B

| Lot # | Lot Name | Quantity | Current Price | Countdown | |
|---|---|---|---|---|---|
| 1 | Coal A | 50,000 tons | $12.34/ton | 0:02 | Accept |
| 2 | Coal B | 20,000 tons | Not Open | ---- | Accept |

Fig. 8C

| 811 | 812 | 813 | 814 | 815 | 810 |
|---|---|---|---|---|---|
| Lot # | Lot Name | Quantity | Current Price | Countdown | |
| 1 | Coal A | 50,000 tons | 92.2 cents /Million BTU | 0:09 | |
| 2 | Coal B | 20,000 tons | Not Open | --- | |

Fig. 9A

| 821 | 822 | 823 | 824 | 825 | 820 | |
|---|---|---|---|---|---|---|
| Lot # | Lot Name | Quantity | Current Price | Countdown | | 826 |
| 1 | Coal A | 50,000 tons | $14.02 | 0:09 | | Accept |
| 2 | Coal B | 20,000 tons | Not Open | --- | | Accept |

Fig. 9B

| 831 | 832 | 833 | 834 | 835 | 830 | |
|---|---|---|---|---|---|---|
| Lot # | Lot Name | Quantity | Current Price | Countdown | | 836 |
| 1 | Coal A | 50,000 tons | $12.59/ton | 0:09 | | Accept |
| 2 | Coal B | 20,000 tons | Not Open | --- | | Accept |

Fig. 9C

METHOD AND SYSTEM FOR CORRECTING MARKET FAILURES WITH PARTICIPANT ISOLATION IN DUTCH STYLE ONLINE AUCTIONS

BACKGROUND OF THE INVENTION

The disclosed invention relates generally to conducting online electronic auctions, and in particular to online electronic auctions featuring partial quantity evaluated rank bidding.

Traditional Procurement Models

Procurement of supplies has traditionally involved high transaction costs, especially information search costs. The introduction of electronic commerce has introduced new methods of procurement that lower some of the transaction costs associated with procurement. Online procurement, or business-to-business electronic commerce, matches buyers and suppliers so that transactions can take place electronically. There are three models for online procurement: catalog, buyer-bidding auction, and supplier-bidding auction.

The "catalog" model of online procurement was the first to be developed. The first electronic catalogs were developed by suppliers to help customers obtain information about products and order supplies electronically. These first electronic catalogs were single-source; i.e. they only allowed customers to obtain information and products from that supplier.

However, customers are not typically satisfied with being "locked in" to one supplier—they wanted to be able to compare a number of competing products to be sure of getting the product features they wanted, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services has compiled a database that lists all airplane parts suppliers that have a certain item in stock. Buyers dial into the database to get information on the parts they need. Here, it is a third party, Inventory Locator Service, not a supplier, creating the unbiased electronic market.

The electronic catalog model of electronic commerce involves one buyer and one supplier at a time. When many buyers compete for the right to buy from one supplier, a buyer-bidding auction model is created. A noteworthy example of the buyer-bidding auction model is that operated by PriceLine.com and described in U.S. Pat. No. 5,794,207 issued to Walker et al. In this system, potential buyers compete for airline tickets by submitting a bid for an airline ticket on the PriceLine website, and airlines can choose to accept a bid, thereby committing the buyer to buy the ticket.

The catalog and buyer-bidding auction types of electronic markets do not work in some situations however. If the required product is custom made for the buyer, it is not possible for suppliers to publish a set price in advance for a catalog market. Likewise, it is not possible for buyers to specify all of the details of the product they want to purchase in a buyer-bidding auction. Traditionally, when a company requires a custom industrial product, procurement is made by a buyer for the company who searches for a potential supplier and acquires custom-tailored price quotes from a supplier for the needed custom product. The search is slow and somewhat random because it usually relies heavily on personal relationships. The costs associated with locating vendors, comparing their products, negotiating, and paperwork become big factors in a purchase decision. The cost of switching suppliers is very large, which means that the quoted price is probably not the lowest fair price and that it is hard for a new supplier to enter the market.

As an alternative, buyers use auctions to save money. The assignee of the present application developed a system wherein suppliers downwardly bid against one another to achieve the lowest market price in a supplier-bidding auction.

Supplier-Bidding Auction

In a supplier-bidding auction, bid prices typically start high and move downward in reverse-auction format as suppliers interact to establish a closing price. The auction marketplace is one-sided, i.e. one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers do not typically purchase one component at a time. Rather, they purchase whole families of similar components. At times, components are strongly related to one another. As an example, a buyer might purchase a given plastic knob in two different colors, or might purchase a nameplate in four different languages. These parts are so similar that by definition they must be purchased from the same supplier—all of the knobs are made using the same mold. These items are therefore grouped into a single lot. Suppliers in industrial auctions must provide unit price quotes for all line items in a lot.

Auction Process

The process for a supplier-bidding auction is described below with reference to FIGS. 1 and 2. FIG. 1 illustrates the functional elements and entities in a supplier-bidding auction, while FIG. 2 is a process diagram that identifies the tasks performed by each of the involved entities.

The supplier-bidding auction model requires that the bidding product or service be defined by the buyer 10. An auction coordinator 20 works with buyers 10 to prepare for and conduct an auction and to define the potentially new supply relationships resulting from the auction.

As shown in FIG. 2, in the Initial Contact phase 102 of the auction process, the coordinator 20 contacts the buyer 10, and the buyer 10 provides data to the coordinator 20. The coordinator 20 prepares a specification 50 for each desired product or part 52. Once the product 52 is defined, potential suppliers 30 for the product are identified. The coordinator 20 and buyer 10 work together to compile this list of potential suppliers from suppliers already known to the buyer 10 as well as suppliers recommended by the coordinator 20.

The buyer 10 makes a decision regarding which potential suppliers 30 will receive invitations to the upcoming Auction. Suppliers 30 that accept Auction invitations are then sent notices regarding the upcoming Auction, as well as client software to install in preparation of participating in the Auction.

In the RFQ phase 104, the coordinator 20 works with the buyer 10 to prepare a Request for Quotation ("RFQ") 54. The coordinator 20 collects and maintains the RFQ data provided by buyer 10, and then publishes the RFQ 54, and manages the published RFQ 54. The RFQ 54 includes specifications 50 for all of the parts 52 covered by the RFQ 54. In the RFQ 54, buyer 10 aggregates similar part or commodity line items into job "lots." These lots allow suppliers 30 to bid on that portion of the business for which they are best suited.

During the auction 56, bids 58 will be taken against individual lots (and their constituent parts 52) within RFQ 54. While suppliers 30 must submit actual unit prices for all line items, the, competition in an Auction is based on the aggregate value bid for lots. The aggregate value bid for a lot depends upon the level and mix of line item bids and the quantity for each line item. Therefore, suppliers 30 submit bids at the line item level, but compete on the lot level.

In the Auction Administration phase 106, coordinator 20 coordinates the Auction and administers the Auction setup and preparation. The coordinator 20 sends a RFQ 54 to each participating supplier 30, and assists participating suppliers 30 with preparation for the Auction.

In the Auction phase 108, suppliers 30 submit bids 58 on the lots and monitor the progress of the bidding by the participating suppliers 30. The coordinator 20 assists, observes, and administers the Auction.

When the bidding period is over, the auction enters the Auction Results Administration phase 110. In this phase, coordinator 20 analyzes and administers the Auction results, which are viewed by buyer 10. The buyer 10 begins to conduct final qualification of the low bidding supplier(s). The buyer 10 retains the right not to award business to a low bidding supplier 30 based on final qualification results or other business concerns.

In the ensuing Contract Administration phase 112, the coordinator 20 facilitates settlements 60 awarded by the buyer 10 to suppliers 30. Contracts 52 are then drawn up between buyer 10 and suppliers 30.

Communications and Software

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider 40 accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. The client component is used by suppliers 30 to make bids during the Auction. The bids are sent via the network service provider 40 to the site of the coordinator, where it is received by the server component 23 of the software application. The client component 31 includes software used to make a connection through telephone lines or the Internet to the server component 23. Bids 58 are submitted over this connection and updates are sent to connected suppliers.

Bids 58 can only be submitted using the client component 31 of the application—this ensures that buyers do not circumvent the bidding process, and that only invited suppliers participate in the bidding. Typically, bidders can see their bids and bids placed by other suppliers for each lot on the client component 31. When a bidder submits a bid, that bid is sent to the server component 23 and evaluated to determine whether the bid is from an authorized bidder, and whether the bid has exceeded a pre-determined maximum acceptable price. Bids placed by a supplier are broadcast to all connected bidders thereby enabling every participating bidder to see quickly the change in market conditions and begin planning their competitive responses.

SUMMARY OF THE INVENTION

Traditional Dutch style auctions have played a key role in the world flower industry. In the Dutch auction method, a descending clock is viewed by a group of potential purchasers of a lot of flowers. The purchase price displayed at any moment is synchronized to the clock. As the time passes, the posted price declines. The auction ends when the first bidder stops the descending clock by pressing a button, thereby accepting the lot for the posted price. Dutch auctions have proven to be extremely valuable to the originator of the auction as a mechanism for extracting a greater share of the bidder surplus.

It should be noted that for centuries, the Dutch auctions used in the flower market have been designed for the benefit of the auction originator. In this case, the auction originator has been the collective of flower growers. The "sellers" in the auctions own the entire auction infrastructure. So the rules were built to extract the highest possible price from buyers.

When the traditional Dutch auction is turned around to benefit buyers, some fundamental barriers arise. When all buyers are competing to buy the exact same physical product, they are able to compete for a product of the exact same actual quality, no matter which buyer prevails. When the auction market is turned around to benefit buyers, the physical product in question is not the exact same product, but in fact each bidder is offering a "version" of the desired product. When this is true, the buyer cannot count on all offered versions being of the exact same quantity.

This situation, where actual quality of product differs, is very problematic for Dutch auction implementations because the then-current price on the auction clock may not represent versions of similar quality. The present invention, using online auction technology with bidders in remote locations, can be used to solve the problem of non-comparability of product.

Online versions of the Dutch auction are implemented through the broadcast of a posted price to physically isolated bidders. These broadcasts enable each of the bidders in remote locations to re-create the same view of the Dutch auction market. In this manner, each of the isolated bidders can participate as if they were in the same room watching the movement of a single clock and the corresponding posted price. The creation of a common view has been a general goal of conventional online Dutch auction systems. Improvements of online Dutch auctions are typically focused on ensuring consistency and commonality in the presentation of the auction market to the various isolated bidders.

While conventional online Dutch auction systems seek to increase the similarity between bidders' views into the Dutch auction, the present invention seeks to capitalize on differences between the views of isolated bidders. The present invention capitalizes on bidder isolation by controlling an individual bidder's view into the Dutch auction market.

In one embodiment, posted prices are originally defined in the context of the originator of the auction. These posted prices are transformed into the individual contexts of potential bidders prior to display at the bidder computer system. Multiple views into the Dutch auction are thereby supported.

Consider a coal auction market. All coal is not created equal. For example, coal varies in its thermal content (i.e., BTU content) as well as in its sulfur content. Buyers would be willing to pay more, all things being equal, for higher thermal content or lower sulfur content. A buyer therefore is ultimately interested in the price per unit energy (e.g., cents/Million BTU) produced when the coal is processed through their power generation unit.

Suppliers, however, typically offer coal on a price per physical measure of weight or volume (e.g., $/ton) basis. The raw $/ton offers of the participating supplier cannot be readily compared to each other due at least in part to the underlying differences in the characteristics of the coal. To solve this problem, the supplier's bid in $/ton is transformed into a factor that the buyer can use to compare offerings of different quality, in this case into a factor of cents/Million BTU. The Dutch style auction clock operates on the value of cents/Million BTU. The then-current value of the auction clock is de-transformed back through the transformation function into the terms of the supplier's offering, in this case $/ton. Thus, in a Dutch auction for coal, prices that are originally defined in cents/Million BTU are transformed, based upon a particular supplier's coal characteristics, into $/ton prices prior to display at a bidding supplier's computer system.

Through this transformation process, bidding suppliers are able to individually view an ongoing auction in their own context. From a bidding supplier's view, all other suppliers are effectively offering the same type of coal.

It is a feature of the present invention that the isolation of bidders can be further exploited by restricting the amount of market clearing information that is provided to one or more bidders. In an in-person Dutch auction all potential bidders will know the market clearing price for each of the lots that are sold. This information can be used by the potential bidders in determining their strategies for subsequent auctions on similar lots.

In the present invention, feedback formats can be specified such that potential bidders receive little or no information regarding their competitor's bidding activity. The absence of received information spurs the individual bidders to place a bid nearer to their walk-away price. The capture of bidder surplus by the originator of the auction is thereby maximized.

In a further embodiment of the invention, a bidder provides only a part of the total quantity of product desired by the auction originator. In this embodiment, a traditional Dutch style auction format is typically not applicable, because the Dutch style ends when a bid is received for a whole lot. In the case of an online Dutch auction, the bidder can indicate a quantity as well as whether they've accepted the then-current posted price in the auction. The auction would proceed not just until the first bid is received, but until bids adding up to the originator's entire quantity have been received.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the tasks performed by the entities involved in an auction process;

FIG. 8A illustrates a Dutch auction user-interface;

FIG. 8B illustrates a Dutch auction user-interface;

FIG. 8C illustrates a Dutch auction user-interface;

FIG. 9A illustrates a Dutch auction user-interface;

FIG. 9B illustrates a Dutch auction user-interface;

FIG. 9C illustrates a Dutch auction user-interface; and

DETAILED DESCRIPTION

Figure 1:
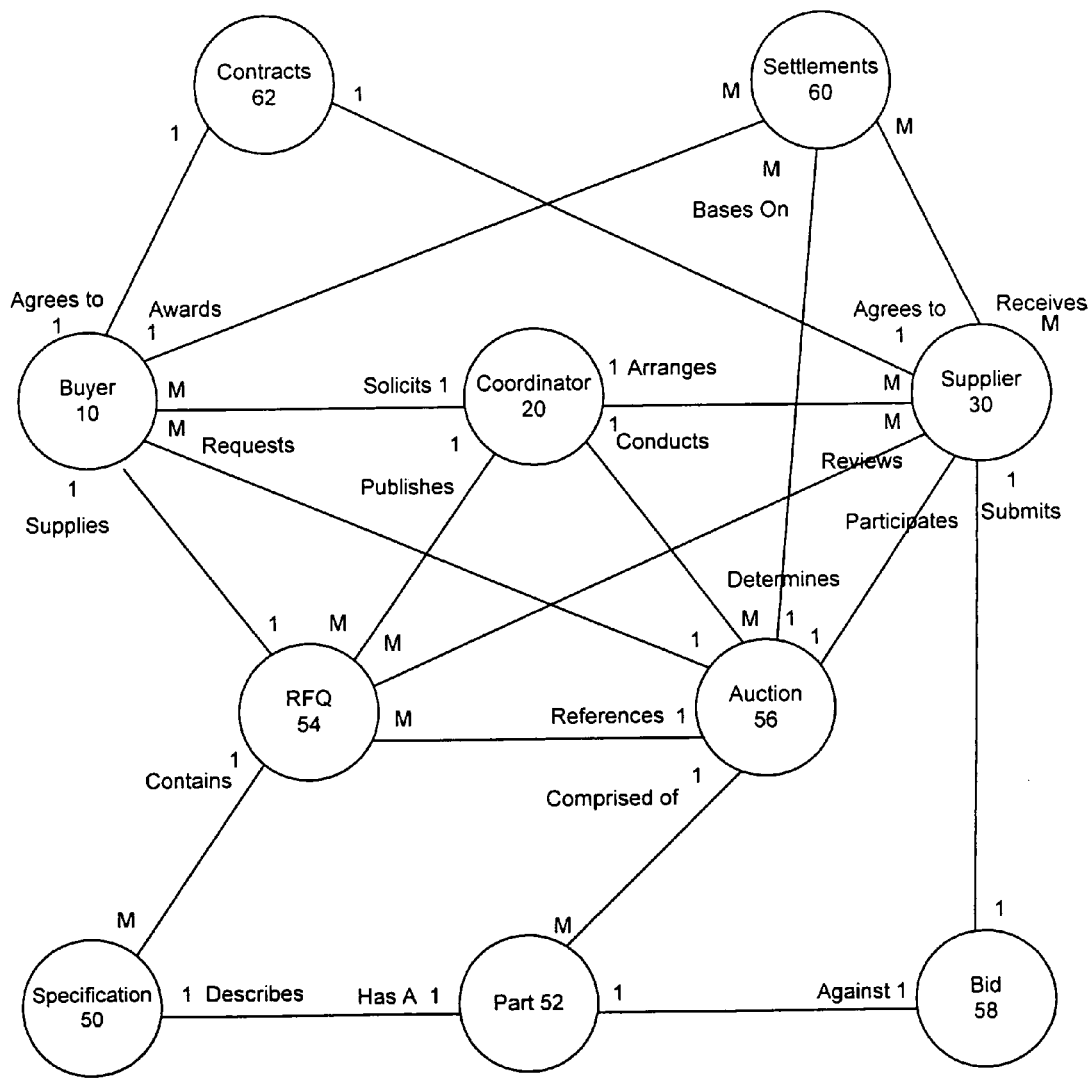
FIG. 1 illustrates the elements and entities involved in an auction process.
Figure 3:
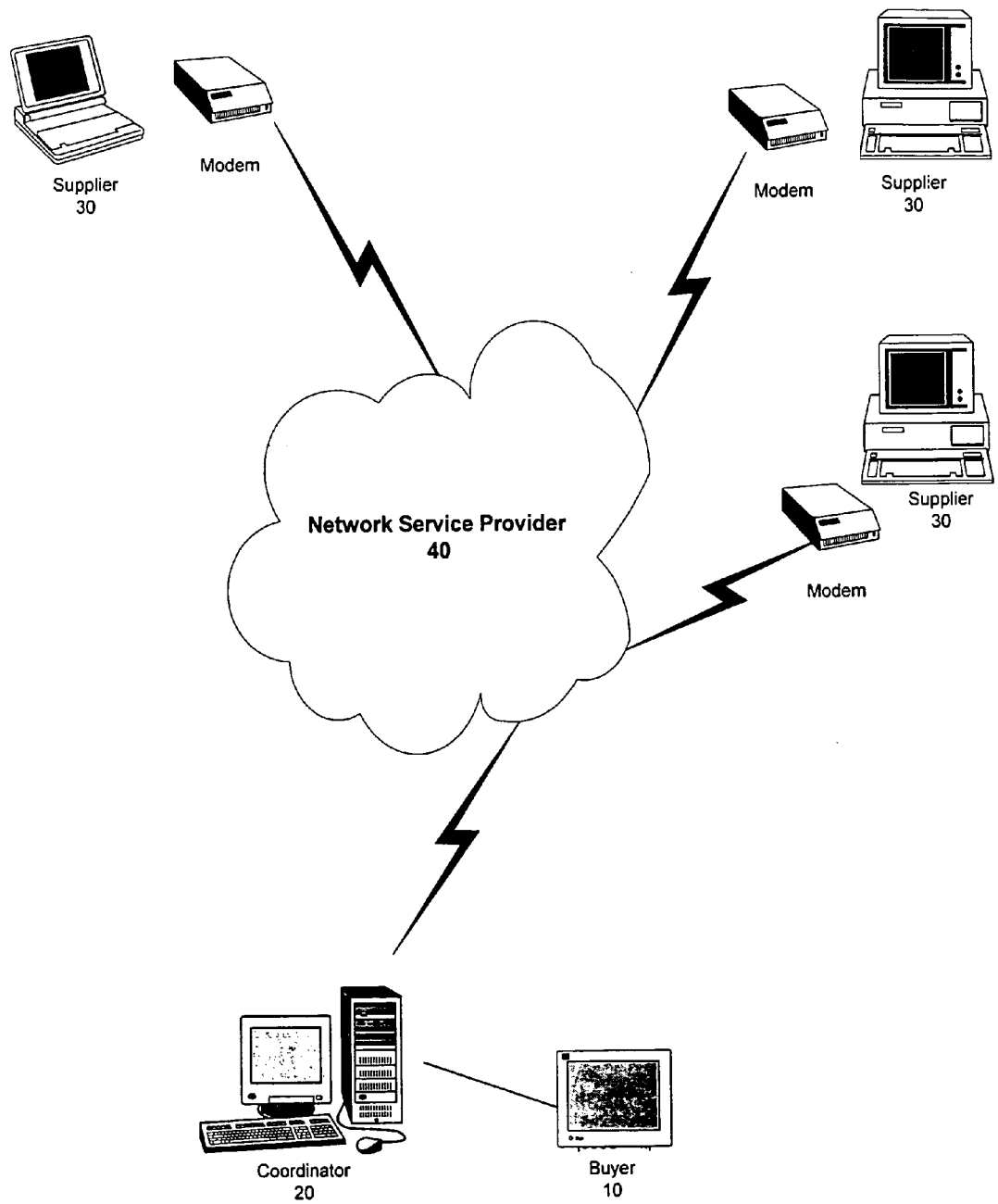
FIG. 3 illustrates the communications links between the coordinator and the potential suppliers in an auction.
Figure 4:
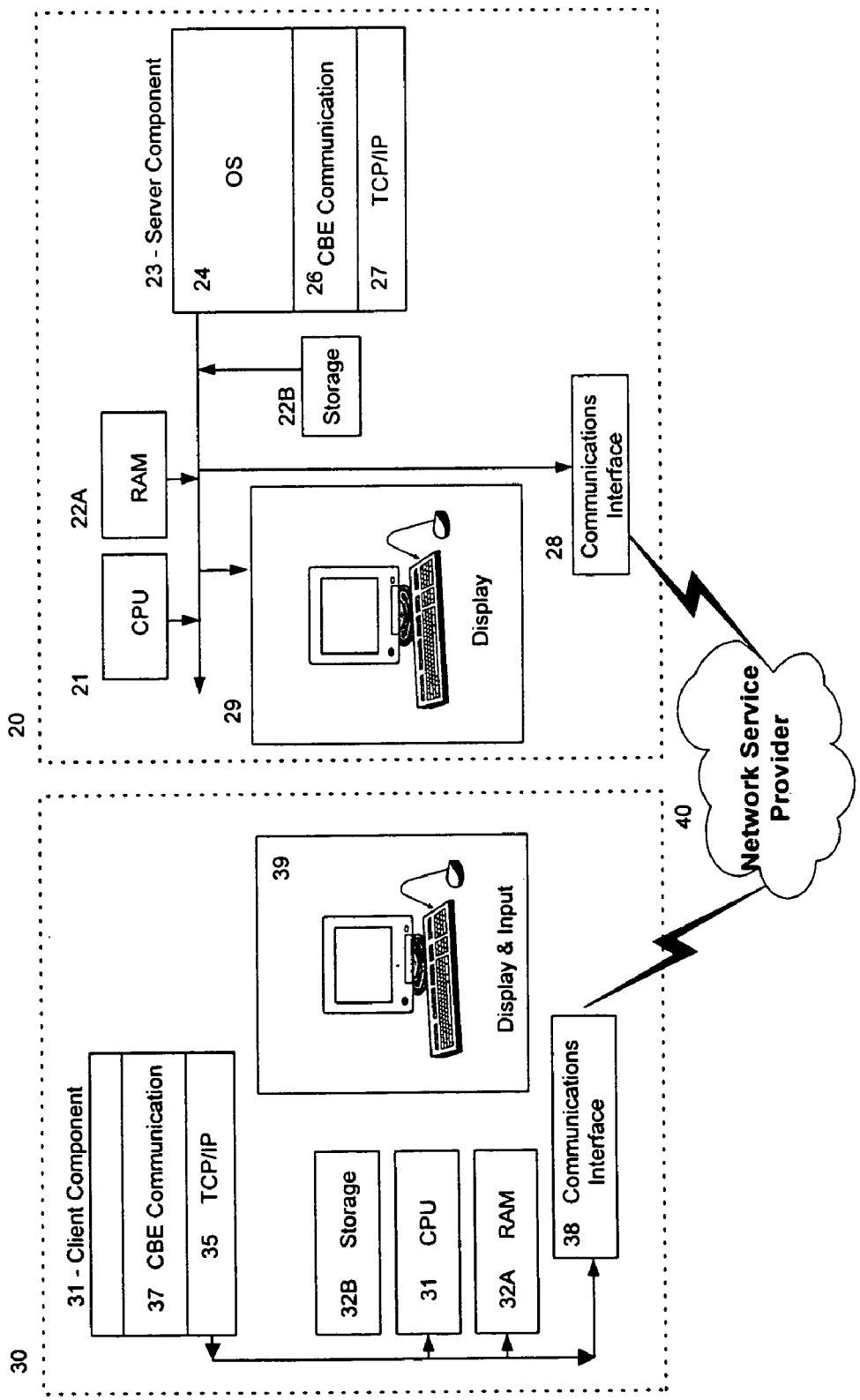
FIG. 4 illustrates the client and server components of the computer software application that conducts the auction and the hardware at the sites of the coordinator and the potential suppliers on which the client and server components operate.

Reference will now be made in detail to the preferred embodiments of the present invention, examples of which are illustrated in the accompanying drawings. The present invention described below extends the functionality of the inventive electronic auction system and method described in greater detail in U.S. patent application Ser. No. 09/252,790, entitled "Method and System for Conducting Electronic Auctions," filed Feb. 19, 1999, now U.S. Pat. No. 6,230,146, the disclosure of which is hereby expressly incorporated in the present application.

Online electronic auctions provide a powerful interactive medium for creating and capitalizing upon traditional auction dynamics. The extensive reach of online electronic auctions combined with inherent forms of anonymity make it an attractive choice for virtually any auction sale. Online electronic auctions enable potential bidders to view a rapidly changing auction landscape as hundreds of bids can easily be processed within a few hours.

In an interactive bidding event, bidders compete against each other as they react to bids submitted by their competitors. In a downward-price, supplier-bidding auction, this interaction stops when a bid is made that attracts no further lower bids. In other words, the auction tends to reach the "second best" price that a supplier might offer. By definition, the last bid only goes as low (high) as the second lowest (highest) bidder is willing to go.

For example, consider the following bidding scenarios in a downward-price, supplier-bidding auction. As illustrated in Table 1, each supplier A-G has a "walk-away" price (or floor) that defines the end of their participation in the interactive bidding event.

TABLE 1

| | Potential Offerings | |
|---|---|---|
| Supplier | Scenario 1 Best Price | Scenario 2 Best Price |
| A | $10.05 | $10.05 |
| B | $10.00 | $10.00 |
| C | $9.98 | $9.15 |
| D | $10.06 | $10.06 |
| E | $10.09 | $10.09 |
| F | $11.00 | $11.00 |
| G | $10.25 | $10.25 |

In scenario 1, the suppliers interact until supplier B submits his final bid of $10.00. Supplier C counters at $9.99. No other seller can match supplier C's price and the market closes at $9.99. In this scenario, the buyer left $0.01 "on the table" since supplier C would have willingly bid $9.98. As the $0.01 differential is quite small, this outcome is reasonably acceptable.

In scenario 2, each of the "walk-away" prices for suppliers A, B, and D-G remain the same. Supplier C, on the other hand, has a reduced "walk-away" price of $9.15. During the auction, the suppliers again interact until supplier B submits his final bid of $10.00. Supplier C counters at $9.99. As no other seller can match supplier C's price, the market closes at $9.99. In this scenario, the buyer left $0.84 "on the table" since supplier C would have willingly bid $9.15. This $0.84 differential is unacceptably large.

As these scenarios illustrate, interactive auctions will consistently fail to extract most of the supplier surplus for the buyer. This problem of surplus retained by the low bidding supplier is a function of the distribution of offering prices and the sensitivity of the buyer to price. In general, the steeper the supply curve, the greater the surplus that is retained by the supplier.

Dutch auctions can help the buyer to extract more of the supplier surplus. Dutch flower auctions have played a key role in the world flower industry. The Dutch flower auction takes place in an open warehouse/auction hall. The seller establishes a price estimated to be a price well above the price at which a bidder will bid to purchase flowers. This price is posted on a visible display such as an electronic scoreboard. When the auction begins, the price displayed on the board begins to change in pre-specified increments downward at pre-specified increments of time. The price keeps declining until a bidder, witnessing the prices within the auction hall, indicates that he/she is willing to pay the displayed price for the lot of products. Once a bid is received, the clock stops, the lot is "sold" and the auction ends. Bidders bid by making visual signals to the auctioneer controlling the clock, or by using a device like a remote control allowing them to signal their acceptance.

Because the auction closes upon the first bid, the bidder retains little surplus. Instead, the originator of the auction captures most of the surplus. This results because the bidder is more inclined to place a bid just after the posted price has passed his "walk-away" price. The auction house uses the clock speed to manage the surplus. Generally, faster clock speeds reduce the decision time to the disadvantage of the bidders.

In this process, bidders must assess in real-time whether their competitors can place a bid at the current posted price. The longer the bidder waits, the more likely that another bidder will place a bid. Thus, a bidder determines whether to submit a bid by assessing the tradeoff of achieving a lower price against the risk that another bidder will submit a bid, pre-empting his/her own bid.

The present invention involves online auctions. Accordingly, bidders are not physically present at the auction site. Rather, bidders log into an auction server using their computers. Instead of physically inspecting goods, bidders learn of requirements through a printed or online specification document.

Figure 5:
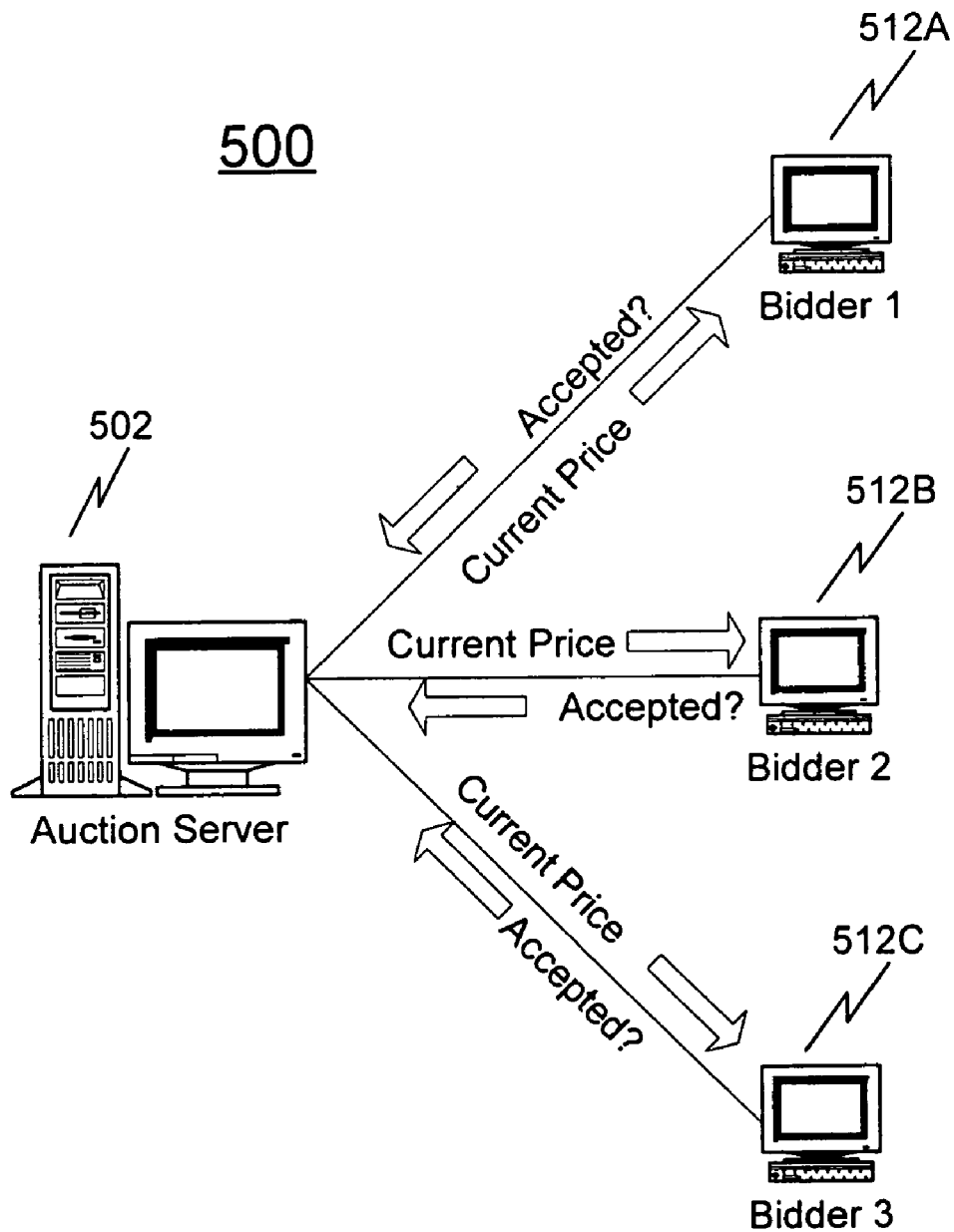
FIG. 5 illustrates a generic Dutch auction system.

FIG. 5 illustrates a generic environment of an online Dutch auction system 500. Online Dutch auction system 500 includes auction server 502 and bidder computer systems 512A-512C. Bidder computer systems 512A-512C communicate with auction server 502 via an electronic communications network (not shown). As would be appreciated by one of ordinary skill in the relevant art, the electronic communications network can exist in various forms, including a private network or a public network (e.g., Internet).

In implementing a Dutch auction, auction server 502 broadcasts current price information to each of the bidder computer systems 512A-512C. The receipt of the current price information enables each of the bidder computer systems 512A-512C to display a current posted price. If a particular bidder decides to accept the posted price, then the bidder computer system transmits a message to auction server 502 indicating the bidder's acceptance.

In a buyer-bidding (supplier-bidding) auction, the posted price will start at a top (bottom) of a predefined range and fall (rise) in discrete increments towards the bottom (top) of the predefined range. In this manner, the client component displays prices that are controlled by the auction server component.

Through the broadcast of the posted price, each of the bidders is able to re-create the same view of the Dutch auction market. In this manner, each of the bidders can participate as if they were in the same room watching the movement of a single clock and the corresponding posted bid price. This feature of online auctions is especially critical in the Dutch auction context because it ensures that no bidder is placed at a disadvantage by having an inaccurate assessment of the systematic change in the posted price.

The creation of a common view has been a general goal of conventional online Dutch auction systems. Improvements of online Dutch auctions are typically focused on ensuring consistency and commonality in the presentation of the auction market to the various potential bidders. Any perceived disadvantage by one or more bidders could quickly eliminate the attractiveness of the online Dutch auction. This results because online Dutch auctions are focused on providing equal amounts of information to bidders who cannot rely on their physical presence at the auction.

The present invention represents a significant shift away from the goals of conventional Dutch auction systems. While conventional online Dutch auction systems seek to increase the similarity between bidders' views into the Dutch auction, the present invention seeks to capitalize on differences between bidders' views. As detailed below, it is a feature of the present invention that the creation of dissimilar views into a Dutch auction market can produce significant advantages for the originator of the Dutch auction.

In an "in-person" Dutch auction market, all potential bidders are present in a single room. All bidders can personally view the same auction lot (e.g., flowers) that is for sale. As each bidder is bidding for the same item, there is no variation in the characteristics of the item being bid upon. During the Dutch auction, bidders physically view the changes in the posted price. There is no competitive advantage amongst the various bidders. Each bidder must determine based upon the "feel" of the room whether they should accept the posted price.

In an online Dutch auction, on the other hand, bidders are isolated. The present invention capitalizes on this isolation by controlling an individual bidder's view into the Dutch auction market. As will be described, the creation of dissimilar views into a Dutch auction market enables the present invention to increase the functionality of the Dutch auction.

As noted, "in-person" Dutch auctions are focused on a single auction lot, the price of which is controlled by a single clock. There are no variations in the characteristics of the item being offered or in its price.

In an online Dutch auction of the present invention, on the other hand, variations in the characteristics of the auction item or in its price can be incorporated into the auction. These variations in characteristics and price are seamlessly hidden from the view of the individual isolated bidders. From an individual bidder's perspective, the online Dutch auction in which he is participating is being conducted upon uniform items and pricing.

This feature of the present invention is particularly significant in the context of industrial auctions. In an industrial auction, suppliers are bidding to supply a buyer's requirement. Typically, while each supplier is expected to fabricate an offering of the same quality, in reality they provide items of somewhat different quality. Thus, for industrial purchasers, attempting to accept bids from suppliers in a Dutch-style auction is problematic due to the differences in value. Generally, quality differences tend to make the playing field "unlevel"—taking away the buyer's ability to use price as the deciding factor. This situation reduces the attractiveness of Dutch-style auctions to industrial buyers.

The coal market illustrates the problems that can be created for an industrial buyer. Generally, all coal is not created equal. Coal is typically unique to the supplier. Coal can be characterized using measures such as thermal content, percentage sulfur, percentage ash, percentage water/moisture, hardness, etc. The uniqueness in the coal dictates that buyers can value the same lot of coal in a different manner depending upon their relative weighting of the various coal characteristics. The buyer's situation is also relevant to the valuation of the coal because the time frame of required delivery, the types of power generation units used by the buyer, etc. can also affect the buyer's valuation of a lot of coal. In many cases, the buyer is ultimately interested in the price per unit energy produced when the particular lot of coal is processed through their power generation unit.

A conventional Dutch style auction is not suited for the sale of coal. Due to the uniqueness in the coal that each bidder is offering, no single posted price in $/ton would adequately reflect a common valuation. An "in-person" Dutch auction or an online Dutch auction simulating the "in-person" dynamics would therefore be unable to create an auction market for coal.

Creation of a coal market is dependent upon a uniform pricing mechanism that enables various forms of coal to be compared by the buyer. This uniform pricing mechanism is enabled in the present invention through a transformation process. Prior to describing the application of the transformation process to Dutch auctions, the transformation process is explained first in the context of interactive bidding events within the coal market.

Typically, bids for coal are submitted on a price per physical measure of weight or volume (e.g., $/ton) basis. The raw $/ton bids of the participating suppliers cannot be readily compared to each other due at least in part to the underlying differences in the characteristics of the coal. Thus, a transformation process is needed to transform the $/ton bids for unique lots of coal into standardized units of value to the buyer (e.g., price-per-unit-of-energy such as cents/Million BTU). After all of the $/ton bids are transformed into standardized units of value, the buyer can readily identify the market leading bids.

General transformation bidding is described in greater detail in co-pending application Ser. No. 09/282,157, entitled "Method and System for Conducting Electronic Auctions with Multi-Parameter Price Equalization Bidding," filed Mar. 31, 1999, the disclosure of which is hereby expressly incorporated in the present application.

Figure 6:
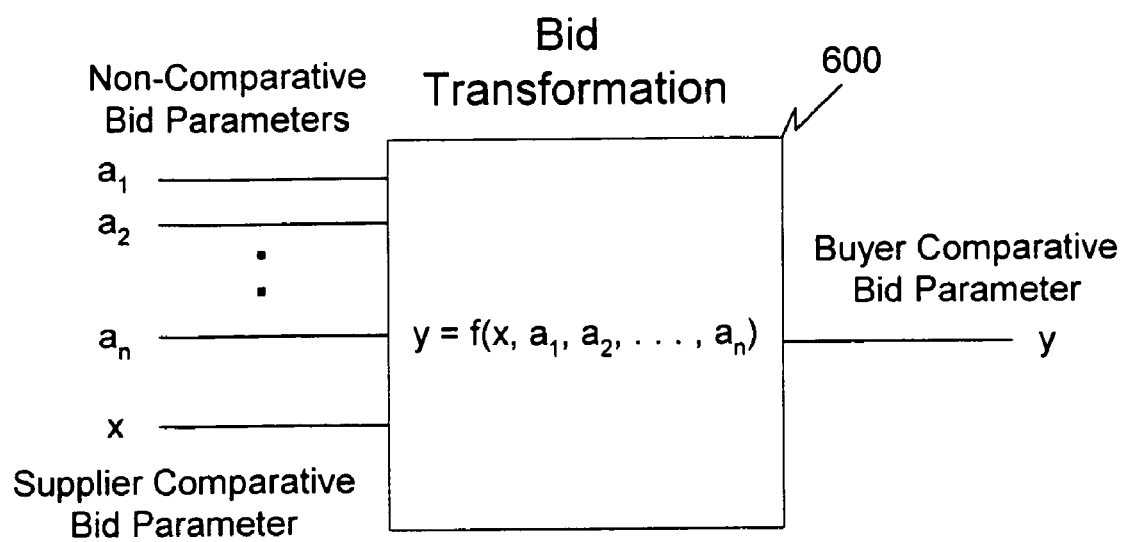
FIG. 6 illustrates a generic transformation function.

The general transformation mechanism is illustrated in FIG. 6. As illustrated, bid transformation 600 represents a function (f) that is operative on input variables (x) and ($a_1 \ldots a_n$). In the context of downward-price, supplier-bidding auctions, input variables ($a_1 \ldots a_n$) represent non-comparative bid parameters, input variable (x) represents a supplier comparative bid parameter (e.g., price), and the output of bid transformation 600 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In the generic description of the transformation process in FIG. 6, two types of comparative bid parameters exist. A buyer comparative bid parameter (y) refers to a parameter, resulting from the transformation process, upon which the buyer will compare competing bids. A supplier comparative bid parameter (x), on the other hand, refers to an input to the transformation function (f). The supplier comparative bid parameter can be used by a supplier to compare competing bids in the supplier's context. In some applications, the supplier comparative bid parameter is not used because all parties view the auction in the buyer's context.

As noted, non-comparative bid parameters are also used as inputs to the transformation process. Unlike supplier comparative bid parameters, non-comparative bid parameters (e.g., non-price parameters) are not directly used to compare competing bids.

In this transformation framework, a supplier comparative bid parameter value can be modified by the transformation process based upon non-comparative bid parameter values to yield a buyer comparative bid parameter value.

Where a single buyer comparative bid parameter (e.g., price) is output by the transformation process, competition between bids is based on the relative magnitude of the values of the buyer comparative bid parameter associated with each of the bidders.

The transformation function used in the coal market can be modeled as a linear transformation. This transformation can be represented by the algebraic function $y=mx+b$, where m is the multiplicative factor, b is the additive factor, x is the supplier comparative bid parameter (e.g., raw $/ton bid), and y is the buyer comparative bid parameter (e.g., transformed cents/Million BTU bid). Both the multiplicative and additive factors are based upon characteristics (e.g., coal characteristics, delivery specifications, etc.) of a submitted bid.

In a downward-price, supplier-bidding interactive competitive bidding event, suppliers submit bids interactively as the market leading bid trends downward towards the final auction price. Each of the submitted bids, originally defined in $/ton, is transformed in real-time to cents/Million BTU bids. The transformed cents/Million BTU bids are used by the buyer to compare submitted bids.

Each of the submitted bids is also broadcast to all of the plurality of competing suppliers. Prior to display at the supplier computer system, however, the cents/Million BTU bids are detransformed in real-time into the context of the receiving supplier. This detransformation process is explained in detail below in the context of Dutch auctions.

In a Dutch-style auction for the supplier-bidding competitive bidding event, suppliers monitor a posted price that begins at the lower end of the buyer's predefined range and continues upward until a supplier accepts the posted price or the top end of the predefined range is reached. For a buyer in the coal market, the range of prices are originally defined in terms of a standardized unit of value to the buyer such as price-per-unit-of-energy (e.g., cents/Million BTU).

Figure 7:
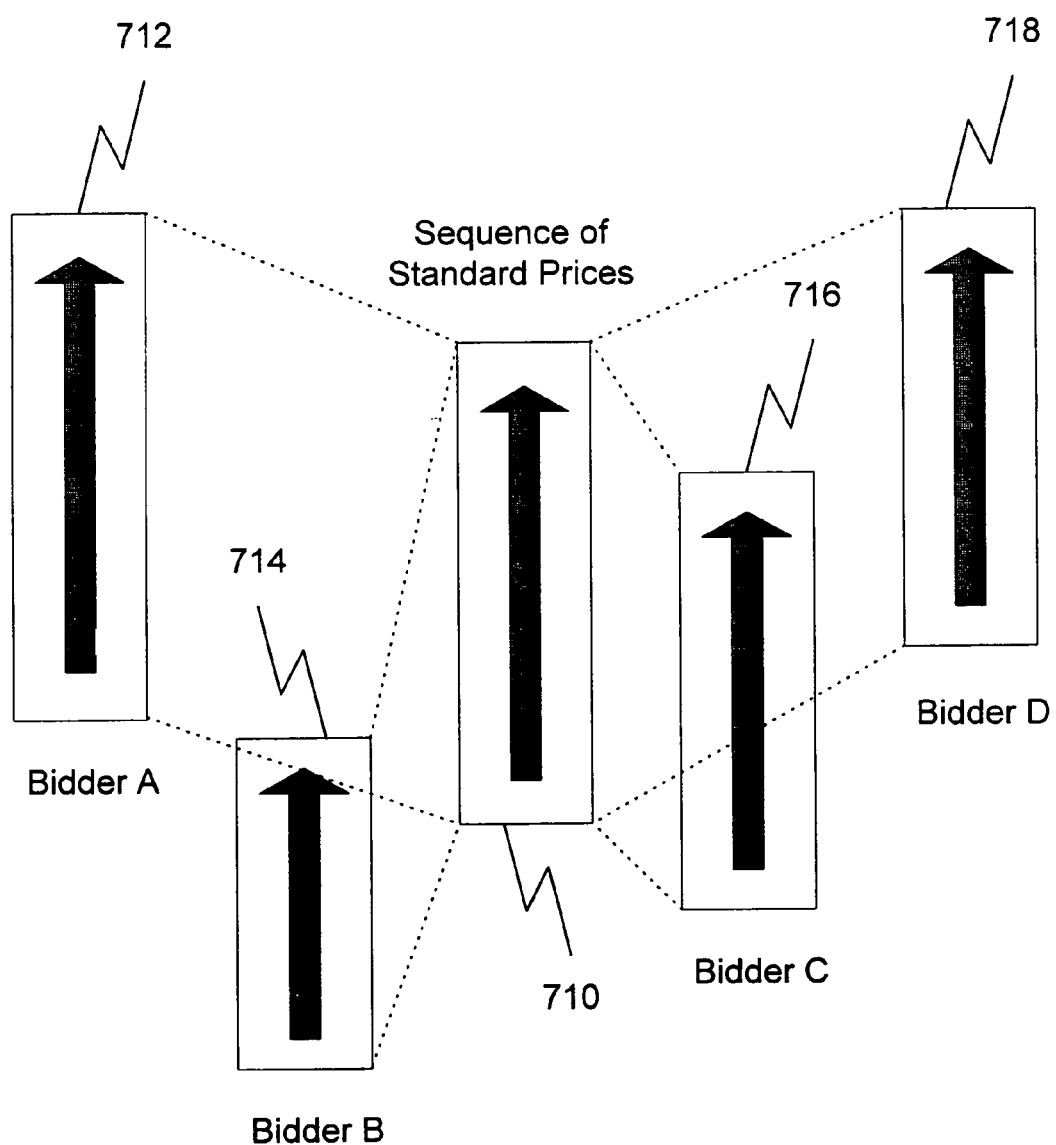
FIG. 7 illustrates bidder-specific ranges that are based on a sequence of standard prices.

This range of prices is illustrated in FIG. 7 as sequence of standard prices 710. Sequence 710 is a range of standard prices (or price array) that is to be broadcast to each of the potential suppliers. For example, in the coal market, the sequence of standard prices can be defined to begin at 92 cents/Million BTU and end at 95 cents/Million BTU. The rate of change and the increments of change in the sequence of standard prices are under the control of the auction server. In to the preferred embodiment, the auction server is loaded with information specifying time increments, price increments, start time, and end time. In one embodiment, the time increments and/or price increments are variably defined by a table or function. Generally, both the time increments and the price increments can be configured such that they are controllable in real-time during the auction.

The standard price of cents/Million BTU has meaning to the buyer only. Each of the potential suppliers are familiar only with their own measures of $/ton for their specific type of coal. Accordingly, prior to display of the posted price to each of the potential suppliers, the cents/Million BTU price is converted into $/ton prices.

In the coal market, this conversion process (referred to above as detransformation) is effected by solving the transformation function, $y=mx+b$, for x to yield the formula $x=(y-b)/m$. Cents/Million BTU values, that are to be broadcast to a supplier, are converted to $/ton values using the multiplicative factor (m) and additive factor (b) for that supplier's offering. It should be noted that a given bidder can have more than one offering. For example, a given supplier can compete with two types of coal. For simplicity, it is assumed at this point that each supplier competes with only one offering.

FIG. 7 illustrates the creation of bidder specific views into the Dutch auction. A sequence of standard prices is displayed as converted prices to bidders A-D. The range of prices seen by an individual bidder is thus compressed or expanded, as well as offset either higher or lower than standard by the transformation process. In the coal market example, each of bidders A-D is offering to sell a specific type of coal. A transformation function defined by the buyer enables a cents/Million BTU price for a specific type of coal to be converted to a $/ton price.

Conversion is governed by the formula $x=(y-b)/m$. Each bidder offering (i) has assigned to it a specific multiplicative factor $m_i$ and additive factor $b_i$, based on the coal characteristics for that bidder. Thus, for bidder A, a standard price of 90 cents/Million BTU is converted to a $/ton price using the factors $m_A$ and $b_A$. Similarly, a cents/Million BTU price is converted to a $/ton price for bidders B, C, and D using the factors $m_B$ and $b_B$, $m_C$ and $b_C$, and $m_D$ and $b_D$, respectively. Each price in the sequence of standard prices undergoes a conversion process. In this manner, a standard price array 710, corresponds to equivalent bidder-specific price arrays 712, 714, 716, and 718.

FIGS. 8A-8C and 9A-9C illustrate in greater detail the relation between a sequence of standard prices and the corresponding sequence of supplier-specific prices. FIG. 8A illustrates an embodiment of a user interface 810 that is presented to a buyer. User interface 810 includes lot number column 811, lot name column 812, quantity column 813, current price column 814, and countdown column 815. A row in lot number column 811, lot name column 812, and quantity column 813 includes information that identifies the lot that is the subject of the auction. Auctions for multiple lots can be performed simultaneously.

Current price column 814 and countdown column 815 include information that specifies the current state of the Dutch auction for the particular lots. For example, consider the auction for Lot #1. User interface 810 shows the initial standard price that will be offered to the suppliers. The standard price of 92 cents/Million BTU is a buyer comparative bid parameter. Prior to display in the user interfaces of the competing suppliers, the buyer comparative bid parameter is transformed into a supplier comparative bid parameter (e.g., $/ton). Note that the transformation process can be performed in either the server component or the client component.

Countdown column 815 identifies the amount of time remaining before a new auction price is to be posted. In user interface 810, the posted price of 92 cents/Million BTU will be changed in two seconds. As would be appreciated by one of ordinary skill in the relevant art, the time between changes in the posted price are long enough to compensate for worst-case communication delay or "latency" between the auction server component and the various client components.

FIG. 8B illustrates an embodiment of a user interface 820 that is presented to supplier A. Similarly, FIG. 8C illustrates an embodiment of a user interface 830 to that is presented to supplier B. Columns 821-825 of user interface 820 and columns 831-835 of user interface 830 correspond to columns 811-815 of user interface 810.

While lot number columns 811, 821, 831, lot name columns 812, 822, 832, quantity columns 813, 823, 833, and countdown columns 815, 825, 835 display is the same information, current price columns 814, 824, 834 display information that is specific to the buyer or supplier. As illustrated in FIG. 8A, the initial standard price of 92 cents/Million BTU is displayed in current price column 814 of buyer user interface 810. This initial standard price is converted into the supplier specific prices that are to be displayed in supplier user interfaces 820, 830.

Assume that the linear transformation function that relates supplier A's $/ton prices ($x_A$) to the buyer's cents/Million BTU prices (y) is represented by the equation $y=m_A x_A + b_A$, where $m_A=0.87$ and $b_A=82$. By this relation, the 92 cents/Million BTU price is transformed into $/ton for supplier A's type of coal using the equation $x_A=(y-b_A)/m_A=(92-82)/0.87=\$13.79$/ton. This transformed $13.79/ton price is displayed in column 824 of user interface 820 for supplier A. In this manner, supplier A can make a determination of whether the $13.79/ton posted price is within his bidding range.

In a similar manner, assume that the linear transformation function that relates supplier B's $/ton prices ($x_B$) to the buyer's cents/Million BTU prices (y) is governed by the multiplicative factor $m_B=0.97$ and $b_B=80$. By this relation, the 92 cents/Million BTU price is transformed into $/ton for supplier B's type of coal using the equation $x_B=(y-b_B)/m_B=(92-80)/0.97=\$12.34$/ton. This transformed $12.34/ton price is displayed in column 834 of user interface 830 for supplier B. In this manner, supplier B can make a determination of whether the $12.34/ton posted price is within his bidding range.

If either supplier A or supplier B feels compelled to accept the first posted price, then supplier A or supplier B would click on accept button 826A, 836A before the countdown in column 825, 835 reaches zero. By clicking on select button 826A, an acceptance message is transmitted by the client component to the auction server component. If the supplier is the first one to accept the posted price, then that supplier would win the auction for Lot #1. If no supplier chooses to accept the first posted price before the countdown goes to zero, then the auction server would proceed to the next price in the sequence of standard prices.

FIGS. 9A-9C illustrate the state of the Dutch auction upon the selection of is the next price in the sequence of standard prices. In FIG. 9A, the next price in the sequence of standard prices is 92.2 cents/Million BTU. This price is displayed in column 814 of user interface 810. Prior to display in the user interfaces 820 and 830 for supplier A and supplier B, respectively, the standard price of 92.2 cents/Million BTU is transformed into the context of supplier A and supplier B. In this process, the new posted prices are determined by calculating $x_A=(y-b_A)/m_A=(92.2-82)/0.87=\$14.02/\text{ton}$, and $x_B=(y-b_B)/m_B=(92.2-80)/0.97=\$12.59/\text{ton}$. The new posted prices of $14.02/ton and $12.59/ton are then displayed in columns 824 and 834 of user interface 820 and 830, respectively. The new posted prices can then be evaluated by supplier A and supplier B prior to the finish of the countdown.

If no supplier chooses to accept the posted price, then the auction server will proceed along the sequence of standard prices. In this progression through the sequence of standard prices, the auction server can reduce or increase the amount of time that the suppliers have to make their decision at the current posted price. This variation between changes in the posted price is similar to the change in speeds of a clock of a conventional Dutch auction.

As described, each change in the standard price produces a corresponding change in the posted price that appears in the user interface for each of the suppliers. These corresponding changes trace through a range of prices that can be unique to that supplier. This auction environment is therefore represented by the plurality of supplier-specific price arrays that are illustrated in FIG. 7.

In effect, multiple "clocks" are used in the Dutch auction of the present invention. This is in sharp contrast to conventional "in-person" Dutch auctions that relied on a single clock in creating a competitive environment. Significantly, although multiple "clocks" are effectively used, each bidder has the impression that only a single "clock" is used. By exploiting the isolation of individual bidders, the present invention is therefore able to create new auction markets.

The creation of multiple bidder-specific price arrays can also be advantageously used in conducting a Dutch auction in multiple currencies. Multi-currency bidding is described in co-pending U.S. application Ser. No. 09/282,158, entitled "Method and System for Conducting Electronic Auctions with Multi-Currency Bidding," filed Mar. 31, 1999, the disclosure of which is hereby expressly incorporated in the present application. In an online Dutch auction incorporating multi-currency bidding, the number of different currencies that may be supported is virtually unlimited. Further, the multi-currency transformation can be configured to assign a fixed penalty of bids in certain currencies, reflecting the costs of banking transactions to exchange into the desired currency.

In the present invention, the isolation of individual bidders can be further exploited by customizing the bidding feedback that is provided to the potential bidders. In an "in-person" Dutch auction, all bidders are able to view all aspects of the ongoing auction as well as the result of the auction. Each bidder knows the price that is accepted by the winning bidder.

In an online auction, on the other hand, the originator of the auction can advantageously limit the amount of information that is provided to the individual bidders. As detailed below, market clearing information can be selectively withheld from one or more competing suppliers.

In a preferred embodiment, the auction server component is configured not only with values specifying the time increments, price increments, start time, and end time, but also with a value specifying a particular feedback format. As will be described in greater detail below, various feedback formats can be used in various auction situations to benefit the originator of the auction. It is therefore a further feature of the present invention that the isolation of the potential bidders is exploited through the control of the dissemination of market clearing information.

In a first feedback format, no feedback is provided to the bidders. In this scenario, bidders can accept posted prices but the "clock" will continue and prices will be seen to rise until the top end of the predefined price range has been reached. Bidders are given no indication whether their bid is a winning bid or not. This feedback format is useful in markets where bidders are known to one another and are likely to collude. In this case, the buyer may desire that none of the bidders know what the market-clearing price is.

This feedback format also enables a buyer to accept a non-low bid without upsetting the true low bidder. For example, in industrial markets where incumbent suppliers are participating, the buyer may wish to collect second and third place bids. Note that in a traditional live Dutch auction, there is no value to "second place" while in industrial settings, there may be value. The present invention uses participant isolation and limited feedback to induce second, third, and higher placing bids. Moreover, this feedback format enables a buyer to break a collusive cartel by making the solicitation and quoting absolutely private.

In a second feedback format, bidders are informed that "bids have been received." Bidders are not informed, however, of the number of bids or the corresponding price levels. In this limited feedback format, viewers are notified immediately when a bid is received and are likely to be coerced into submitting a bid of their own. In this way, the lead bidder helps to drive other bidders to react.

In a third feedback format, bidders are given immediate feedback upon the submission of their bid. One type of feedback would be a generic "thank you for bidding" message, with no indication of whether the bid was a winning or losing bid. This type of feedback prevents the bidder from discerning what the winning price was. The originator of the auction retains full flexibility to award to a non-low (or non-high) bidder, because no bidder has any reason to believe that his bid was above or below other bids.

Another possible type of feedback is a message indicating whether their offer was accepted or rejected. Non-low (or non-high) bidders therefore know that the market cleared below (above) their bid, but do not know how low (high). Non-bidders would see nothing. This direct feedback format is useful in a case where a buyer is interested in the low bid but does not wish the non-low bidders to know the low bid.

In a fourth feedback format, a complete bid history can be provided to the bidders. This full feedback mechanism can be useful where the second place bid is significant.

The four feedback formats described are merely exemplary of other possible feedback formats. The particular feedback chosen for a particular auction event is based upon the particular goals of the buyer. Customization of the feedback mechanism is a feature of the present invention that exploits the physical isolation of the potential bidders.

In yet another feature of the present invention, the isolation of bidders can be used to define different upper and lower bounds for the auction clock in the Dutch-style auction. Consider, for example, the scenario where a participating bidder is the current supplier of the desired product to the buyer. In conducting a conventional Dutch-style auction, the buyer runs the risk that no other supplier will bid before the current bidder. If this is the case, the auction price is likely to run higher, and potentially substantially higher, than the current price the buyer is paying. To let the current supplier witness this situation would provide to that supplier a knowledge advantage to the buyer's disadvantage.

This situation can be rectified if the current supplier's clock and price is restricted to stop at the moment the price reaches the buyer's historical price from that supplier. Other bidders would see their clocks continue to run and would be able to submit bids. This has the effect of preventing a bidder from entering a price in excess of this historic price. This type of rule would be difficult to implement in a physically co-located auction hall.

In yet another feature of the present invention, the Dutch auction technique can be used where a bidder can provide only part of the total quantity of product desired by the auction originator. In this case, a Dutch style auction format is typically not applicable, because the Dutch auction ends when a bid is received for a whole lot. In the case of an online Dutch auction, the bidder can indicate a quantity as well as whether they've accepted the then-current posted price in the auction. The auction would proceed not just until the first bid has been received, but when bids adding up to the originator's entire desired quantity have been received.

It is a feature of the present invention that the auction takes into consideration the quantity of product offered. A conventional Dutch auction may not be suited to the sale of bulk commodities where demand volumes may exceed the supply volumes of any one particular bidder. In this case, the Dutch style auction would need to accommodate offerings for less than the total required offering.

Bidding for partial quantities in online auctions is described in greater detail in co-pending application Ser. No. 09/490,877, entitled "Method and System for Partial Quantity Evaluated Bidding in Online Auctions," filed concurrently herewith, the disclosure of which is hereby expressly incorporated into the present application. A partial quantity Dutch style auction would have the effect of combining the best features of each. The Dutch style auction dynamic induces bids at or very near the best available price from among a group of bidders. The partial quantity feature induces aggressive bids that may be available from smaller suppliers to help reduce the auction originator's weighted-average cost of acquisition. Additional benefits of the partial quantity auction technique are described in the co-pending application referenced above.

Figure 10:
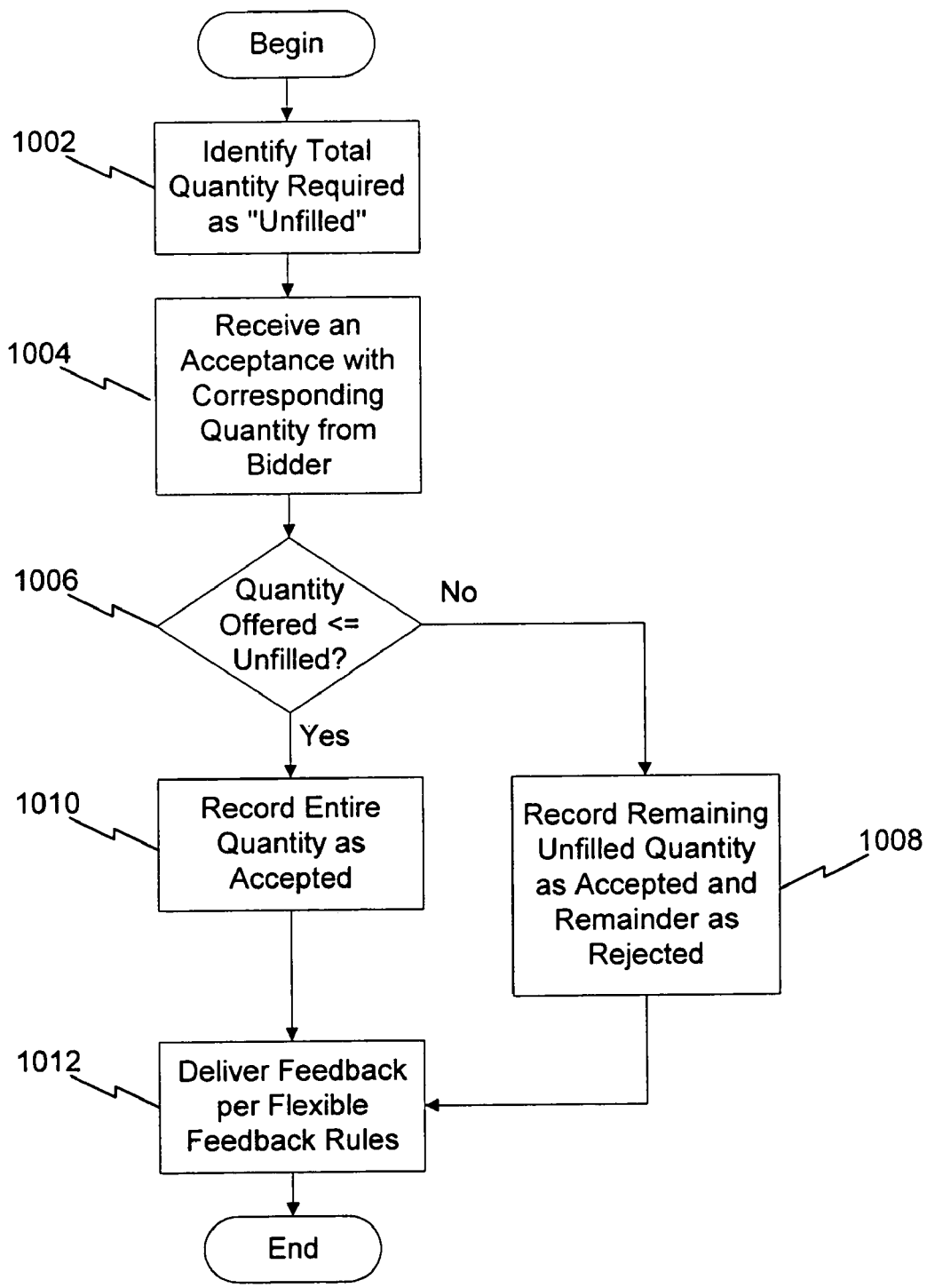
FIG. 10 illustrates a Dutch auction process that incorporates partial-quantity allocation of bids.

An embodiment of the logic behind a partial quantity Dutch style auction is illustrated in FIG. 10. At step 1002, the auction is initialized with a total quantity of product required, and is referred to as the unfilled quantity. In a preferred embodiment, bids are received at step 1004 when a participant accepts the then-current price posted in the Dutch style auction and also indicates the quantity of product offered with that "acceptance."

At step 1006, the quantity of product offered is compared to the then-current unfilled quantity. If the quantity offered is less than the then-current unfilled quantity, then at step 1010, the entire amount of the quantity offered is recorded as being accepted. If by contrast, the quantity offered exceeds the then-current quantity unfilled, then the quantity of the offering equal to the remaining unfilled quantity is recorded as being accepted and the remainder is recorded as being rejected in step 1008. Feedback is governed at step 1012 per the feedback rules described above.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward-price, supplier-bidding auctions, the principals can be equally applied to upward-price, buyer-bidding auctions. Thus, it is intended that the present invention cover the modifications and variations of this invention provided they come within the scope of the appended claims and their equivalents.

What is claimed is:

1. A computer-implemented method in an auction between a plurality of potential bidders, comprising:
   generating a sequence of values;
   creating a buyer view of the auction that includes a first value included in the sequence of generated values;
   prior to displaying a price to a first potential bidder, using a processor to transform, using a characteristic associated with a quality of an auction item, said first value into a first bidder comparative bid parameter value;
   creating a first bidder view of the auction, for display to said first potential bidder, that includes the first bidder comparative bid parameter value;
   prior to displaying a price to a second potential bidder, using a processor to transform said first value into a second bidder comparative bid parameter value; and
   creating a second bidder view of the auction, for display to said second potential bidder, that includes the second bidder comparative bid parameter value.

2. The method of claim 1, wherein generating a sequence of values comprises predefining a series of price increments or decrements.

3. The method of claim 2, wherein generating a sequence of values further comprises changing said predefined series of price increments or decrements in real-time during the auction.

4. The method of claim 1, wherein transforming comprises performing one of a linear transformation, non-linear transformation, and lookup table transformation.

5. The method of claim 1, wherein transforming comprises performing a combination of linear, non-linear, and lookup table transformations simultaneously.

6. A machine readable medium having stored thereon executable code which causes a machine to perform a method to conduct an auction between a plurality of bidders, said method comprising:
   generating a sequence of values;
   creating a buyer view of the auction that includes a first value included in the sequence of generated values;
   prior to displaying a price to a first potential bidder, transforming, using a characteristic associated with a quality of an auction item, said first value into a first bidder comparative bid parameter value;
   creating a first bidder view of the auction, for display to a first potential bidder, that includes the first bidder comparative bid parameter value;
   prior to displaying a price to a second potential bidder, transforming said first value into a second bidder comparative bid parameter value; and
   creating a second bidder view of the auction, for display to said second potential bidder, that includes the second bidder comparative bid parameter value.

7. The medium of claim 6, wherein generating a sequence of values comprises predefining a series of price increments or decrements.

8. The medium of claim 7, wherein generating a sequence of values further comprises changing said predefined series of price increments or decrements in real-time during the auction.

9. The medium of claim 6, wherein transforming comprises performing one of a linear transformation, non-linear transformation, and lookup table transformation.

10. The medium of claim 6, wherein transforming comprises performing a combination of linear, non-linear, and lookup table transformations simultaneously.

11. A system for conducting an auction between a plurality of bidders, comprising:

a processor; and a memory coupled with the processor, wherein the memory is configured to provide the processor with instructions which when executed cause the processor to:

generate a sequence of values;

create a buyer view of the auction that includes a first value included in the sequence of generated values;

prior to displaying a price to a first potential bidder, transform, using a characteristic associated with a quality of an auction item, said first value into a first bidder comparative bid parameter value;

create a first bidder view of the auction, for display to a first potential bidder, that includes the first bidder comparative bid parameter value;

prior to displaying a price to a second potential bidder, transform said first value into a second bidder comparative bid parameter value; and create a second bidder view of the auction, for display to said second potential bidder, that includes the second bidder comparative bid parameter value.

12. The system of claim 11, wherein generating a sequence of values includes predefining a series of price increments or decrements.

13. The system of claim 12, wherein generating a sequence of values includes changing said predefined series of price increments or decrements in real-time during the auction.

14. The system of claim 11, wherein transforming includes performing one of a linear transformation, non-linear transformation, and lookup table transformation.

15. The system of claim 11, wherein transforming includes performing a combination of linear, non-linear, and lookup table transformations simultaneously.

* * * * *